United States Patent
Bradley

(10) Patent No.: US 9,018,817 B2
(45) Date of Patent: Apr. 28, 2015

(54) RETAINING BANDS

(75) Inventor: Stuart Ian Bradley, Leicestershire (GB)

(73) Assignee: GE Energy Power Conversion Technology Limited, Warwickshire (GB)

( * ) Notice: Subject to any disclaimer, the term of this patent is extended or adjusted under 35 U.S.C. 154(b) by 195 days.

(21) Appl. No.: 13/570,296

(22) Filed: Aug. 9, 2012

(65) Prior Publication Data

US 2013/0043756 A1 Feb. 21, 2013

(30) Foreign Application Priority Data

Aug. 18, 2011 (EP) .................................... 11006750

(51) Int. Cl.
*H02K 1/27* (2006.01)
*H02K 15/03* (2006.01)

(52) U.S. Cl.
CPC ................ *H02K 1/278* (2013.01); *H02K 15/03* (2013.01)

(58) Field of Classification Search
None
See application file for complete search history.

(56) References Cited

U.S. PATENT DOCUMENTS

| 3,828,212 A * | 8/1974 | Harkness et al. ............. 310/153 |
| 4,137,884 A * | 2/1979 | Odazima et al. .......... 123/149 D |
| 5,546,648 A | 8/1996 | Tarrant |
| 5,744,887 A | 4/1998 | Itoh |
| 6,614,140 B2 * | 9/2003 | Uemura et al. .......... 310/156.12 |

FOREIGN PATENT DOCUMENTS

| EP | 2113986 A1 | 11/2009 | |
| EP | 2128963 A1 | 12/2009 | |
| GB | 2299217 A | 9/1996 | |
| JP | 58046856 A * | 3/1983 | ............. H02K 21/08 |

* cited by examiner

*Primary Examiner* — Tran Nguyen
(74) *Attorney, Agent, or Firm* — Parks Wood LLC

(57) ABSTRACT

The present invention relates to a retaining band which provides outer reinforcement for the rotor assembly of a high speed electrical machine. The rotor assembly includes a plurality of circumferentially-spaced permanent magnet assemblies. A retaining band is fitted around the rotor assembly and applies a pre-load to the permanent magnet assemblies in the radial direction. The retaining band has a plurality of voids that are sized and shaped to provide the retaining band with a progressive spring stiffness in the radial direction. The voids are open before the retaining band is fitted and during the fitting process the retaining band is deflected in the radial direction so that the voids close up and the retaining band becomes substantially solid.

18 Claims, 2 Drawing Sheets

RETAINING BANDS

FIELD OF THE INVENTION

The present invention relates to retaining bands, and in particular to bands that are to be fitted around the rotor assembly of an electrical machine (e.g. a motor or generator). The retaining bands will typically be used as reinforcement for permanent magnet assemblies that are circumferentially spaced around the rotor assembly.

SUMMARY OF THE INVENTION

The present invention provides a retaining band to be fitted around the rotor assembly of an electrical machine, the retaining band having a plurality of voids formed therein.

The retaining band can have a progressive radial spring stiffness. More particularly, the voids in the retaining band can be sized and shaped to provide a radial spring stiffness that increases as the retaining band is deflected radially outwardly to close the voids. The voids can have an arcuate shape and extend circumferentially within the retaining band. It will be readily appreciated that the voids are not intended to be grooves or slots like those disclosed in U.S. Pat. No. 5,744,887 (Itoh) for reducing eddy currents but are formed within the body of the retaining band and are substantially enclosed by the band material, particularly at the radially inner and outer surfaces of the retaining band.

The radial width of the voids will typically be proportional to the amount of unloading that the retaining band needs to withstand and this can be defined by the operating temperature range Of the electrical machine. The circumferential ends of each void can be shaped to include stress relief features.

The voids can extend along substantially the entire axial width of the retaining band, which will typically be selected with reference to the design requirements of the rotor assembly, and can be open or closed at the axial edges of the retaining band.

The retaining band will preferably have low radial spring stiffness before it is fitted around the rotor assembly so that it can be easily positioned over the axial end of the rotor assembly. As the retaining band is fitted it will be deflected radially outwardly which causes the voids to close up so that the retaining band becomes substantially solid and the radial spring stiffness increases, This increases the radial spring stiffness of the retaining band and applies a pre-load (or reaction load) to the permanent magnet assemblies. The retaining band will preferably only become fully stiff in the radial direction when the voids are closed or substantially closed. The magnitude of the pre-load applied by the retaining band is preferably greater than the maximum radial induced load that will be experienced by the permanent magnet assemblies during operation of the electrical machine.

In one arrangement the retaining band can include at least one void for each rotor pole or permanent magnet assembly.

The voids can be positioned such that the retaining band has an even stress distribution to avoid stress fractures. In one arrangement the voids can be circumferentially spaced around the retaining band in a substantially symmetrical manner.

The voids can be regions of the retaining band that are devoid of material (i.e. empty spaces) or regions that are filled with a suitable soft, compressible, material such as a polymer like silicone rubber, butyl or polyurethane. The choice of the filler material can depend on factors such as the operating temperature range of the electrical machine, the intended ramping rate and frequency etc. If the voids are filled with a filler material then it will be readily appreciated that the filler material will be compressed as the retaining band is deflected to close the voids. In this case the voids will never be completely closed even when the retaining, band is fitted.

The retaining band can have a machinable (or sacrificial) radially inner layer. The inner layer can be formed from the same material as the rest of the retaining band (e.g. an epoxy or phenolic resin) or it can be formed from a different material (e.g. aluminium) that is bonded or otherwise fixed to the remainder of the retaining band.

The retaining band can be made of a metallic or composite material. For example, the retaining band can be formed from one or more layers of composite material such as an epoxy or phenolic resin in which a metallic mesh such as copper or aluminium mesh, carbon fibres, glass fibres or other high tensile strength materials are embedded.

A rotor assembly for an electrical machine can comprise a plurality of circumferentially-spaced permanent magnet assemblies and as retaining band as described above fitted around the rotor assembly and applying a pre-load to the permanent magnet assemblies in the radial direction. The permanent magnet assemblies can be fixed in position on the rotor assembly using fasteners, adhesive or any other suitable means.

When fitted to the rotor assembly, the voids in the retaining band are preferably closed, or substantially closed (e.g. where any filler material is compressed).

The retaining band may be fitted around the rotor assembly from an axial end using a press or other suitable apparatus.

The fitting of the retaining band can take place at room temperature.

The mandrel that is used during the forming process can be used to support the retaining band during, the axial press operation. Once the retaining band is in position, the mandrel can be released using over-centre clamps, for example.

More than one retaining band can be fitted to a rotor assembly in some circumstances.

The present invention provides a method of forming a retaining band to be fitted around the rotor assembly of an electrical machine, the method comprising the step of: forming the retaining band against a radially outer mandrel, the retaining band having plurality of voids formed therein. More particularly, the retaining band can be made using a conventional lay-up process where layers of composite material are built up using matting, continuous fibres and resin, for example. Such a process can be carried out manually or automated. A radially inner mandrel can be used to form a structure to facilitate injection moulding of the radially inner machinable layer, particularly if polymer resins are to be used.

The voids can be formed using removable inserts of suitable size and shape.

The method can further include the step of tilling the voids with a suitable soft, compressible, material such as a polymer like silicone rubber, butyl or polyurethane. This can be done by injecting the filler material into the voids after the retaining band has been formed.

The method can further include the step of machining the radially inner surface of the retaining band. This can be done While the retaining, band is positioned within the mandrel and means that the retaining band can be provided with a tight inner dimension tolerance to the outer surface diameter of the permanent magnet assemblies. In practice, the inner surface diameter of the retaining band will be machined to be slightly smaller than the outer surface diameter of the permanent magnet assemblies so that the retaining band is deflected during the axial press process and the voids close up to provide the pre-load.

BRIEF DESCRIPTION OF THE DRAWINGS

Exemplary embodiments of the invention will now be described, with reference to the accompanying drawings, in which.

DETAILED DESCRIPTION OF THE PREFERRED EMBODIMENTS

Figure 1:
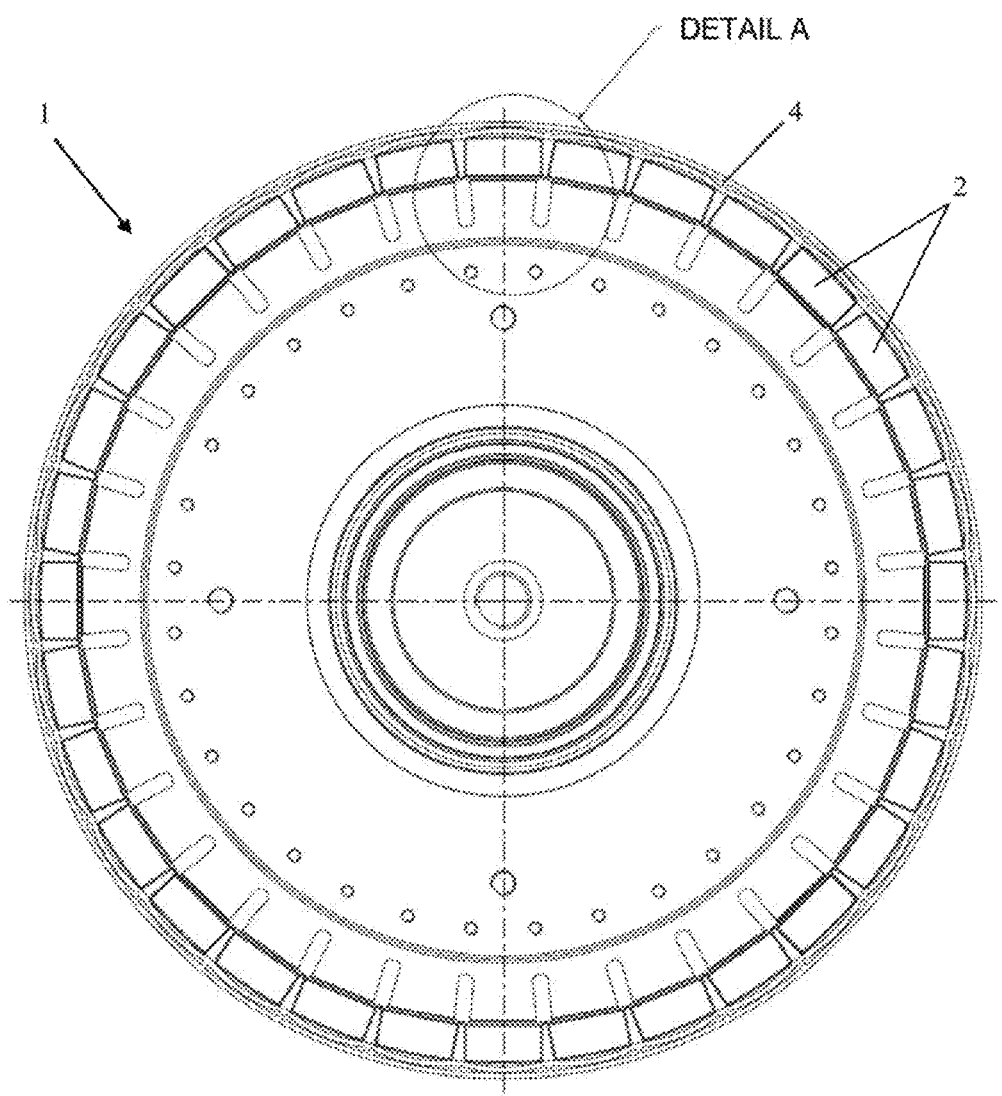
FIG. 1 is an axial view of a rotor assembly including a retaining band according to the present invention.
Figure 2:
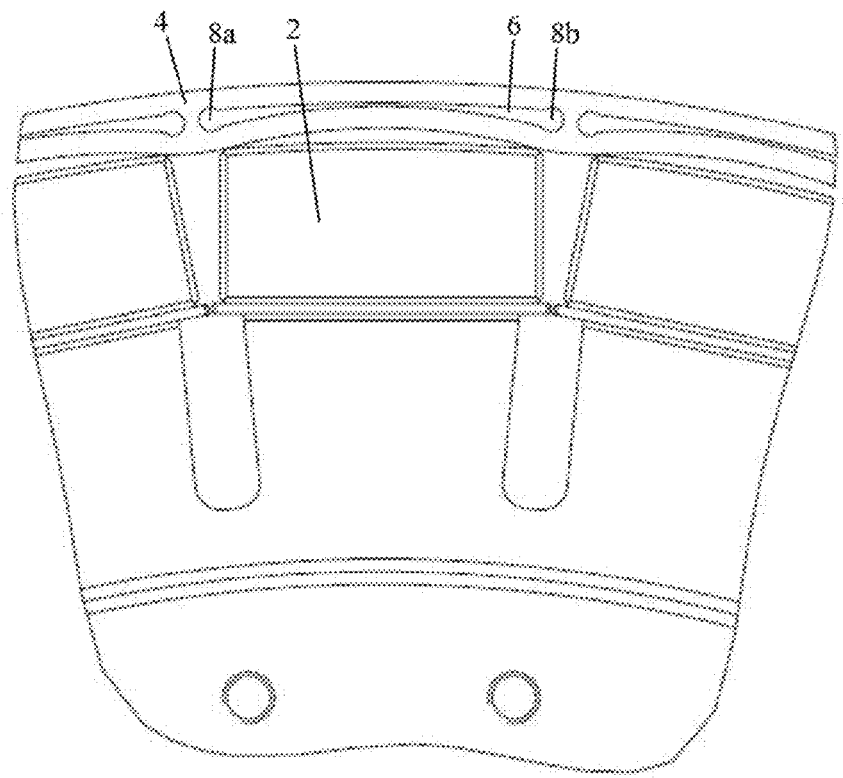
FIG. 2 is an axial view of 'Detail A' shown in FIG. 1.

With reference to FIGS. 1 and 2 a rotor assembly 1 for a high speed rotating electrical machine (e.g. a motor or generator) includes a plurality of circumferentially-spaced permanent magnet assemblies 2 fixed to its radially outer surface.

A retaining band 4 made of a composite material is fitted around the permanent magnet assemblies 2 to provide an outer reinforcement and prevent damage to the permanent magnet assemblies due to high centrifugal loads. The retaining band 4 applies the required pre-load (or reaction load) to the permanent magnet assemblies 2 in the radial direction, i.e. towards the centre of the rotor assembly. The retaining band 4 can cope with tight manufacturing tolerances and does not require the use of a cryogenic fining process. The voids 6 also allow small variations in the outer radius of the rotor assembly due to slight differences between the magnet retaining assemblies to be accommodated.

Figure 3:
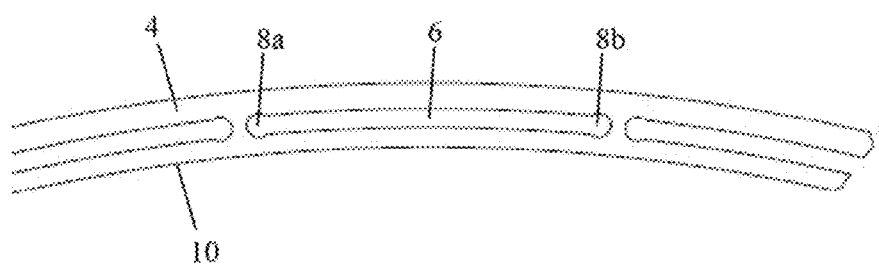
FIG. 3 is an axial view of part of a retaining band before it is fitted to a rotor assembly showing the voids in an open state.

As shown in FIG. 3, the retaining band 4 includes a plurality of circumferentially-spaced voids 6 that are sized and shaped to provide a radial spring stiffness that increases as the retaining band is deflected during the fitting process. Each void 6 is circumferentially aligned with a permanent magnet assembly 2. In FIG. 3 the voids are shown before the retaining band 4 is fitted (i.e. in their open configuration) and they can optionally be filled with a soft, compressible, material such as a polymer like silicone rubber, butyl or polyurethane. The circumferential ends of each void 6 include a substantially circular region 8a, 8b that reduces the likelihood of stress fractures.

When the voids 6 are open, the retaining band 4 has low radial spring stiffness. The retaining band 4 is positioned over an axial end of the rotor assembly 1 and pressed over the radially outer surface defined by the permanent magnet assemblies in the axial direction using a press. As the retaining band 4 is fitted it is deflected outwardly in the radial direction which causes the voids 6 to close up until the retaining band is substantially solid.

The radially inner surface 10 of the retaining band 4 can be machined before it is fitted to give a tight inner dimensional tolerance.

What is claimed is:

1. A retaining band to be fitted around a rotor assembly of an electrical machine, the retaining band being deflectable and having a plurality of voids formed therein to be adjusted based on deflection of the retaining band, wherein the voids provide a radial spring stiffness as the retaining band is deflected radially outwardly.

2. The retaining band of claim 1, having a progressive radial spring stiffness.

3. The retaining band of claim 1, wherein the voids are sized and shaped to provide the retaining band with the radial spring stiffness that increases as the retaining band is deflected to close the voids.

4. The retaining band of claim 1, wherein the voids are regions of the retaining band that are devoid of material.

5. The retaining band of claim 1, wherein the voids are regions of the retaining band filled with a compressible material.

6. The retaining band of claim 1, having a machinable radially inner layer.

7. The retaining band of claim 1, being made of a metallic or composite material.

8. The retaining band of claim 1, the retaining band being formed against a radially outer mandrel.

9. The retaining band of claim 1, wherein the voids are formed using removable inserts.

10. A rotor assembly for an electrical machine, the rotor assembly comprising a plurality of circumferentially-spaced permanent magnet assemblies and a retaining band fitted around the rotor assembly and applying a pre-load to the permanent magnet assemblies in the radial direction, the retaining band being deflectable and having a plurality of voids formed therein to be adjusted based on deflection of the retaining band, wherein the voids provide a radial spring stiffness as the retaining band is deflected radially outwardly.

11. The rotor assembly of claim 10, wherein the voids in the retaining band are closed or substantially closed.

12. A method of forming a retaining band to be fitted around a rotor assembly of an electrical machine, the method comprising the step of forming the retaining band against a radially outer mandrel, the retaining band being deflectable and having plurality of voids formed therein to be adjusted based on deflection of the retaining band , wherein the voids provide a radial spring stiffness when deflecting the retaining band radially outwardly.

13. The method of claim 12, wherein the voids are formed using removable inserts.

14. The method of claim 12, further comprising the step of filling the voids with compressible material.

15. The method of claim 12, further comprising the step of machining the radially inner surface of the retaining band.

16. The method of claim 12, wherein the voids are formed open, and the method further comprises:
   performing a fitting process of the retaining band and closing the voids as the retaining band is deflected outwardly, thereby increasing the radial spring stiffness of the retaining band.

17. The retaining band of claim 6, wherein the machinable radially inner layer is formed of a same material as the retaining band.

18. The retaining band of claim 6, wherein the machinable radially inner layer is formed of a different material of that of the retaining band and is bonded or fixed to the retaining band.

* * * * *